United States Patent Office 3,405,200
Patented Oct. 8, 1968

3,405,200
POLYOLEFIN COMPOSITION CONTAINING A CO-
POLYMER OF ETHYLENE-ACRYLAMIDE-ETH-
YLENICALLY UNSATURATED COMPOUND
Tomohide Yasumura, Shiga-ken, Yasuro Sameshima,
Neyagawa, Kosaku Onodera and Teruo Oono, Shiga-
ken, Isoji Taniguchi, Toyonaka, Kenichi Maemoto,
Takatsuki, and Yoshiharu Tatsukami, Niihama, Japan,
assignors to Toyo Boseki Kabushiki Kaisha, and Sumi-
tomo Chemical Co., Ltd., both of Osaka, Japan
No Drawing. Filed July 1, 1966, Ser. No. 562,113
Claims priority, application Japan, July 8, 1965,
40/40,955
5 Claims. (Cl. 260—897)

ABSTRACT OF THE DISCLOSURE

This invention relates to improved polyolefin composi-
tions having an improved affinity for dyes. More specifical-
ly, this invention relates to moulded polyolefin composi-
tions with improved dyeability comprising a polyolefin and
a copolymer of ethylene, at least one acrylamide com-
pound and at least one ethylenically unsaturated com-
pound other than ethylene and acrylamide compounds,
the amount of said acrylamide compound and ethylenical-
ly unsaturated compound in the copolymer being 1–50
mole percent, based on the ethylene, said copolymer hav-
ing an intrinsic viscosity of 0.1 to 4.0 dl./g. and being
0.1–30 weight percent based on the weight of the polyole-
fin.

The present invention relates to improved polyolefin
composition and, particularly, to polyolefin composition
having an improved affinity for dyes. More particularly,
the invention relates to polyolefin composition comprising
a polyolefin incorporated therein a copolymer of ethylene,
at least one acrylamide, and at least one ethylenically
unsaturated compound.

It is known that polyolefins such as crystalline polypro-
pylene and polyethylene may be moulded into fibers, films
and other shaped articles which have excellent physical
and mechanical properties. These polyolefins, however,
have some inherent drawbacks which restrict their applica-
tion to certain shaped articles. For example, since polyole-
fins themselves are hydrophobic and chemically inert, con-
ventional dyeing methods using conventional dyestuffs are
inapplicable to them, because they cannot be dyed to deep
shades with high fastnesses to sunlight, laundering and dry
cleaning.

For the above reason, much studies have been done for
many years to improve the affinity of polyolefins for con-
ventional dyes and a number of processes have been pro-
posed.

Among these processes, the most outstanding and gen-
erally recommended are those in which certain sub-
stances having an affinity for particular dyestuffs are added
to polyolefins. However, the conventional additives em-
ployed for such purposes are usually poor in compatibility
with polyolefins and, when they are admixed with polyole-
fins, a phase separation takes place. Thus, the convention-
al additives cannot be compatible with polyolefins in any
other manner than as a coarse dispersion, so that a homo-
geneous composition can hardly be obtained. When an
additive used to improve the dyeability of a polyolefin is
dispersed in the polyolefin in the form of rough or coarse
particles, the dyeing efficiency is considerably low as com-
pared with a solid solution or other similar state and,
moreover, the whole state adversely affects the process
of melt-spinning. For example, the filaments might be cut
or broken at the outlet of the spinnerette nozzle, or the
overall drawability of the filaments would be jeopardized.
Thus, the physical, mechanical and some other properties
of the final fiber would prove unsatisfactory. Moreover,
as the filaments are subject to frictional forces upon draw-
ing or other after-treatment, the additive would be mi-
grated itself from the polyolefin giving rise to undesirable
phenomena such as uneven dyeing.

The polypropylene fiber containing the homopolymer
of N-substituted acrylamide was disclosed in Japanese
patent publication No. 5861/1963. This fiber is claimed to
have an improved affinity for dyes, improved fastnesses to
light and gas, and improved resistances to oxidation and
weathering. However, due to the strong polarity of the
homopolymer added, the fiber tends to undergo phase
separation between the homopolymer and polypropylene
so that the above-mentioned disadvantages cannot yet be
avoided.

In order to overcome the above-mentioned disadvan-
tages of the conventional methods and to improve the
affinity for dyes and other properties of polyolefins, we
have studied a number of possible polyolefin additives and
found that when a copolymer of ethylene, at least one
acrylamide compound and at least one ethylenically un-
saturated compound is added to polyolefin, the resulting
compoistion meets such requirements and is fully com-
parable to polyolefin itself in both physical and mechanical
properties and yet, is far superior to polyolefin in dye-
ability and fastness.

An object of the present invention is to provide homo-
geneous polyolefin compositions which are least liable
to undergo phase-separation and has an improved affinity
for dyes. Other objects will be apparent from the follow-
ing description.

In order to accomplish these objects this invention pro-
vides mouldable polyolefin compositions comprising a
polyolefin and a copolymer of ethylene at least one acryl-
amide compound and at least one ethylencially unsatu-
rated compound.

The polyolefins which are used as the fundamental
component of the present compositions include, polymers
such as of monoolefin or diolefin, for example, polyethyl-
ene, polypropylene, poly(butene-1), poly(3-methylbutene-
1), poly(4-methylpentene-1), polystyrene, polybutadiene,
polyisoprene and the like, copolymers such as those of
ethylene-propylene, ethylene-butene-1, propylene-butene-
1, and the like, and a mixture of these polymers or co-
polymers. However, it is preferable to employ isotactic
polypropylene prepared by the use of Ziegler-Natta cata-
lyst.

The acrylamide compounds to be used in the prepara-
tion of the copolymer additive of the present invention are
acrylamides, methacrylamides, N-alkyl substituted acryl-
amides, N-alkyl substituted methacrylamides, N,N-dialkyl
substituted acrylamides and N,N-dialkyl substituted meth-
acrylamides. More particular examples of these acrylam-
ide compounds are acrylamide, N-methylacrylamide, N,
N-dimethylacrylamide, N-ethylacrylamide, N-t-butylacryl-
amide, N,N-diethylacrylamide, N-n-propylacrylamide, N-
isopropylacrylamide, N-isobutylacrylamide, N,N-di-n-bu-
tylacrylamide, N-hexylacrylamide, N-octylacrylamide, N-
laurylacrylamide, N-octadecylacrylamide, N-cyclohexyl-
acrylamide, N-benzylacrylamide, N-phenylacrylamide, N-
methyl-N-phenylacrylamide, N-tolylacrylamide, methac-
rylamide, N-methylmethacrylamide, N-ethylmethacryl-
amide, N-t-butylmethacrylamide, N,N-diethyl methacryl-
amide, N-n-propyl methacrylamide, N-n-butyl methacryl-
amide, N,N-di-n-butyl methacrylamide, N-octyl methac-
rylamide, N-cyclohexyl methacrylamide, N-benzyl meth-
acrylamide, N-phenyl methacrylamide, and the like.

The ethylenically unsaturated compounds to be used
in the preparation of the copolymer additive of this in-
vention are aromatic vinyl compounds such as styrene;

vinyl esters such as vinyl acetate, vinyl butylate, vinyl benzoate, vinyl diethyl acetate, and the like; vinyl halides such as vinyl chloride, vinyl bromide, and the like; vinyl ethers such as methyl vinyl ether, ethyl vinyl ether, phenyl vinyl ether, and the like; vinyl ketones such as methyl vinyl ketone, ethyl vinyl ketone, and the like; acrylic compounds such as acrylic acid, methacrylic acid, methyl acrylate, ethyl acrylate, methyl methacrylate, ethyl methacrylate, N-t-butylaminoethyl acrylate, N-t-butylaminoethyl methacrylate, N-methylamino ethyl acrylate, N,N-dimethylaminoethyl acrylate, N,N-dimethyl aminoethyl methacrylate, N,N-diethyl aminoethyl acrylate, N,N-diethyl aminoethyl methacrylate; acrylonitrile, methacrylonitrile, N-vinyl pyridine, N-vinyl imide, and the like.

The copolymer of ethylene, at least one acrylamide compound and at least one ethylenically unsaturated compound which constitutes one of the components of the compositions of this invention, contains per mole of ethylene unit, 0.01–0.5 mole of the acrylamide unit and 0.01–0.5 mole of the ethylenically unsaturated compound unit and has an intrinsic viscosity of 0.1 to 4.0 dl./g. as measured in tetraline solution at 135° C. The copolymers containing only less than 0.01 mole of at least one acrylamide and less than 0.01 mole of at least one ethylenically unsaturated compound per mole of ethylene do not substantially contribute to improvements in dyeability of the polyolefin when added to the latter in such suitable quantitative range as will be mentioned hereinafter, and if the amounts of said copolymers were excessively large, the resulting compositions would no longer possess the desirable mechanical characteristics of polyolefins, although the affinity of the compositions for dyes might be enhanced. Generally speaking, therefore, such copolymers cannot be used for the purpose of improving the dyeability of polyolefins. On the other hand, those copolymers which contain more than 50 mole percent of acrylamide compound and more than 50 mole percent of ethylenically unsaturated compound are extremely poor in compatibility with polyolefins and, therefore, are not satisfactory for the purpose of the invention.

While intrinsic viscosity is correlated to molecular weight, the copolymers falling into the above-mentioned viscosity range of 0.1–4.0 dl./g. are readily miscible or compatible with polyolefins forming substantially homogeneous compositions. It should also be understood that since the copolymers of the described type generally melt at lower temperatures than polyolefins, the copolymers whose intrinsic viscosity values fall within the above-mentioned range may safely be employed, but that when polyolefins having very low melting points are employed, the copolymers are preferably those which melt in the neighborhood of, or below, the melting point of the particular polyolefin used.

The above-mentioned copolymers which constitute a component of the present composition may be produced according to any conventional manner. Thus, for example, ethylene, one or more of acrylamide compounds and one or more of ethylenically unsaturated compounds are polymerized or are copolymerized in the presence of a polymerization catalyst which may be selected from the group consisting, for example, of oxygen, organic peroxides, azo compounds and the like at an ethylene pressure of 500 to 4000 atmospheric pressure and at a temperature of 100° C. to 300° C. In case of the copolymerization of four or more different kinds of monomers the operation and apparatus would become rather complicated, and therefore it is preferable to employ a ternary copolymerization method in the present invention.

In preparing a composition of this invention, it is generally advisable to use about 0.1 to 30 percent by weight of the copolymer based on the weight of the polyolefin. Then, the resulting composition would be substantially homogeneous and have a great affinity for dyes without adversely affecting the desirable mechanical properties of the polyolefin.

It is a feature of the compositions of this invention that both greater homogeneity and higher dyeability of the composition are attained at the same time. If the amount of said copolymer is below 0.1% by weight based on the polyolefin, the dyeability of the resulting composition would not be as high as practically desirable, while if more than 30% by weight (based on the polyolefin) of the copolymer is used, the composition might lose, in substantial degrees, the desirable characteristics of the polyolefin. While it depends on the desired depth of shade, the particular preferred amount of the copolymer to be added to polyolefin generally ranges from 1 to 15 weight percent for fiber and 1 to 25 weight percent for films and other shaped articles, said amount being based on the weight of the polyolefin.

The above-mentioned materials (polyolefin and copolymer) of the present invention may be readily mixed together mechanically to prepare a homogeneous composition, because both materials are highly miscible or compatible. The admixing can thus be performed by means of a Banbury or other suitable mixer at an elevated temperature or alternatively, by a multi-stage extruding method may be utilized to perform the required mixing or blending and extrusion.

In the course of mixing or prior thereto, a suitable polyolefin stabilizer, such as antioxidant (e.g. alkylphenol compounds), ultraviolet-absorber (e.g. benzophenone derivatives), heat-resisting stabilizer (e.g. thioether compounds of carboxylic acid ester) and metal salts of higher fatty acids and the like may also be added to the compositions without departing from the scope of the present invention.

While the compositions of this invention have an excellent affinity for direct dyes, vat dyes, acid dyes, dispersion dyes, reactive dyes, cationic dyes, metallized dyes, and other dyestuffs, they have particular affinity for dispersion dyes and metallized dyes. The above-mentioned disperson and metallized dyes include, for instance, Sumiplene Yellow G Sumiplene Red G, Sumiplene Blue G (these are trademarks of Sumitomo Chemical Co., Ltd.), Celliton Fast Yellow G (C. I. Disperse Yellow 3), Celliton Fast Yellow 5R (C.I. Disperse Yellow 7), Celliton Fast Orange 5R (C.I. Disperse Orange 1), Celliton Fast Red GG (C.I. Disperse Red 171), Celliton Fast Red 4G, Celliton Fast Violet 6B (C.I. Dilsperse Violet 4) (these are all trademarks of B.A.S.F.), Duranol Blue 2G (C.I. Disperse Blue 24, trademark of I.C.I.), Vialon Fast Yellow G (C.I. Acid Yellow 18), Vialon Fast Red G (C.I. Acid Red 226), Vialon Fast Brown R (C.I. Acid Brown 50), Vialon Fast Yellow R (these are trademarks of B.A.S.F.), Cibalan Blue BL (C.I. Acid Blue 168, trademark of Ciba, Ltd.), Foron Orange GFL (trademark of Sandoz), and the like. The present compositions have high affinity also for chromium dyes such as Sunchromine Yellow GG (C.I. Mordant Yellow 1), Sunchromine Red B (C.I. Mordant Red 15), Sunchromine Fast Blue MB (C.I. Mordant Blue 13), Sunchromine Black A (C.I. Mordant Black 1), Sunchromine Blue Black B (C.I. Mordant Black 3) (these are all trademarks of Sumitomo Chemical Co., Ltd.). In addition, the present compositions have high affinity for other dyes, for example, Xylene Fast Yellow P (C.I. Acid Yellow 61, trademark of Sandoz), Xylene Fast Blue P (trademark of Sandoz), Xylene Fast Blue PR (C.I. Acid Blue 129, trademark of Sandoz), Xylene Fast Red P (trademark of Sandoz), Indanthrene Gold Yellow GK (C.I. Vat Yellow 4, trademark of Hoechst), Indanthrene Red Violet RH (C.I. Vat Violet 2, trademark of Hoechst), Malachite Green (C.I. Basic Green 4), Methylene Blue NS (C.I. Basic Blue 24, trademark of Sumitomo Chemical Co., Ltd.), Xylene Fast Red P (C.I. Acid Red 118, trademark of Sandoz), and the like.

Comparisons of dyeability may be made visually with respect to the shaded of shaped articles, but for added accuracy, measurements may be carried out by means of optical instruments or from the amount of dye adsorbed per unit quantity of the article. Particularly in the case of fiber it is customarily to take the proportion of dye adsorption as criteria.

The compositions of this invention are dyeable up to 100 mg./g. within the serviceable range, although the figure varies depending upon the particular type of dye used and the amount of the copolymer present in the composition. Even in the case of the present compositions suited for fiber making, as high as 50 mg./g. of dyeing is possible. Furthermore, the dyed fibers have high fastness to sunlight, laundering and dry cleaning. The homogeneity of the compositionsc of this invention, as well as the absence of phase separation, may be clearly seen when the dyed film, for instance, is examined with the naked eyes or under a microscope and, when the dyed bundle of filaments is set with epoxy resin and cut, and its cross-section is microscopically examined. The fact that the compositions of this invention are substantially homogeneous can also be ascertained when one considers the fact that the mechanical strength of the shaped articles made from the same are almost equal to that of the poly-alpha-olefin used. For example, the strength of the yarn spun from the present composition containing polypropylene and 10% by weight (based on the polypropylene) of ethylene-N,N-dimethyl acrylamide-vinyl acetate copolymer is virtually identical to the strength of the yarn spun from the polypropylene alone under the same conditions. In contrast, the polyproyplene compositions containing similar amounts of conventional additives inevitably degrade 10% or more. Furthermore, the compositions of this invention are superior to conventional similar compositions in mouldability and, in that particularly, when they are formed into fibers, there is a reduced tendency for breaking or the formation of uneven filaments.

It will be apparent from the above description that the compositions of this invention have improved affinities for dyes, yet retaining the desirable mechanical properties of polyolefin. It is also to be noted that the compositions are also superior to the material polyolefin in printing qualities. Thus, the films or other large-faced products made of these compositions can be attractively printed.

This invention will be further described by referring to the examples which are given for illustration and not for limitation of the invention in any way. In these examples, all the percentages are by weight unless otherwise specified and the abbreviation "OWF" is for "on weight of fibers." Furthermore, the various JIS tests substantially correspond to AATCC (American Association of Textile Chemists and Colorists) as follows:

|  | JIS | AATCC (1956) |
|---|---|---|
| Fastness (sunlight) | L-1044 | STM-16A-56 |
| Fastness (laundering) | L-1045 MC-2 | STM61-54 11A |
| Fastness (dry cleaning) | L-1006 | STM 25-52 |
| Fastness (rubbing) | L-1048 | STM 8-52 |

Example 1

Ten percent by weight (based on polypropylene) of a copolymer of ethylene, N,N-dimethyl acrylamide and vinyl acetate (92.8/2.6/4.6 in mol percent) and having a melting point of 100° C. and an intrinsic viscosity of 0.70 dl./g. as measured in tetraline solution at 135° C. was added to polypropylene powder, and blended. The mixture was extruded into filaments at 210° C., and the filaments were drawn to 4 times their initial length in hot water of 95° C., and then heat-treated at 120° C. for 30 minutes to prepare a fiber. The resulting fiber had a strength value of 5.2 g./d. and an elongation value of 49.0%. Thus, compared with the corresponding values of 5.5 g./d. and 40.4% for a similar polypropylene fiber containing none of the copolymer, no reduction in strength was observed.

The fiber was dyed in a dyeing bath containing 3% OWF of dispersion dye Celliton Fast Yellow G, 2% OWF of nonionic surface active agent, and 1% OWF of anionic surface active agent at 100% C. for 1 hour (liquid ratio: 50:1), and then subjected to soaping for 20 minutes in 0.5 g./l. Marseilles soap bath at 60° C., whereby the fiber was dyed in deep yellow shade. The fastness of the fiber to sunlight, laundering, and rubbing were found to correspond to the JIS 5th grade, and to dry cleaning with perchlorethylene correspond to the JIS 4th grade. When the cross section of the dyed fiber was microscopically examined, the copolymer revealed on sign of phase separation the fiber having been uniformly dyed.

Example 2

6.6 percent by weight (based on polypropylene powder) of a copolymer of ethylene-N,N-dimethylacrylamide-vinyl acetate (86.14/12.8/1.06 in mol percent) and having a melting point of 100° C. and an intrinsic viscosity of 0.64 dl./g. as measured in tetraline solution at 135° C. was added to polypropylene powder and blended. The mixture was extruded into filaments, stretched and heat treated in the same manner as Example 1.

The resulting fiber had a strength value of 5.1 g./d. and an elongation value of 36.2%.

The fiber was dyed with a dyeing bath containing 3% OWF of Vialon Fast Red G, 2% OWF of nonionic surfactant, and 1% OWF of anionic surfactant and carrier E (trademark of Ipposha Co., Ltd., Japan, of a carrier consisting mainly of trichlorobenzene) at 100° C. for 1 hour (liquid ratio: 50:1) and subjected to soaping as Example 1, whereby the fiber was dyed in very deep red shade. The K/S value measured by spectrophotometer was 25.4. The same polypropylene fiber not added with the copolymer was only slightly contaminated when dyed under the same conditions.

Microscopic examination of the cross-section of the same dyed fiber revealed no phase separation of the copolymer, the fiber having been uniformly dyed.

Example 3

Ten percent by weight (based on polypropylene powder) of each copolymer shown in Table 1 were added to polypropylene powder and blended. The mixture was shaped into fibers in the same manner as in Example 1. The fibers were dyed in the same manner as in Example 1 except that different dyes were employed. The dye adsorption was measured in each case. The results are as shown in the following Table 1.

TABLE 1

| Copolymer | Intrinsic viscosity, dl./g. | Comonomer content (mol percent) | | Dye absorption (percent) | |
|---|---|---|---|---|---|
| | | N,N-di methyl acryl-amide | Vinyl acetate | Celliton Fast Red GG | Duranol Blue 2G |
| Ethylene-N,N-dimethyl acrylamide-vinyl-acetate | 0.92 | 4.1 | 0.6 | 75 | 90 |
| Ethylene-N,N-dimethyl acrylamide | 1.03 | 5.3 | | 71 | 78 |
| Ethylene-vinyl acetate | 0.78 | | 5.3 | 60 | 76 |

As is clear from the above table, the fibers of polypropylene added with ethylene-N,N-dimethyl acrylamide-vinyl acetate ternary copolymer are excellent in dyeability (particularly for Duranol Blue 2G) over those added with binary copolymers consisting only of two monomers, even though the content of N,N-dimethyl acrylamide content is rather small in the ternary copolymer.

Example 4

Ten percent by weight (based on polypropylene powder) of each copolymer as shown in Table 2 were added to polypropylene powder and blended. The mixture was shaped into fiber in the same manner as in Example 1. The fibers were dyed in the same manner as in Example 1 except that Celliton Fast Yellow 2G was employed as the dye. The dye adsorption was measured. The results are as shown in Table 2.

TABLE 2

| Copolymer | Intrinsic viscosity dl./g. | Comomomer content (mol percent) | | Dye adsorption (percent) Celliton Fast Yellow 2G |
|---|---|---|---|---|
| | | N,N-diethyl acrylamide | Methyl acrylate | |
| Ethylene-N,N-diethyl acrylamide-methyl acrylate | 0.60 | 4.0 | 1.1 | 44.0 |
| Ethylene-N,N-diethyl acrylamide | 0.52 | 5.2 | | 28.0 |
| Ethylene-methyl acrylate | 0.49 | | 5.4 | 10.2 |

It will be apparent from the above that when a ternary copolymer of ethylene - N,N - diethyl-acrylamide-methyl acrylate is incorporated into polypropylene remarkable improvement in dyeability is obtained in contrast to those cases where only a binary copolymer is added to polypropylene.

Example 5

Five percent by weight (based on polypropylene powder) of a copolymer of ethylene-N,N-dimethyl acrylamide-N,N-diethyl aminoethyl acrylate (84.7/5.2/10.1 in mol percent) and having an intrinsic viscosity of 0.56 dl./g. as measured in tetraline solution at 135° C. and a melting point of 96° C. was added to polypropylene powder and blended. The mixture was shaped into fiber in the same manner as in Example 1. The resulting fiber had a strength value of 5.0 g./d. and an elongation value of 38.2%. When compared with a similar fiber containing none of the copolymer, no reduction in strength was noted.

The fiber was then dyed with a dyeing bath containing 3% OWF of Xylene Fast Red P, 2% OWF of formic acid and 1% OWF of nonionic surfactant and 100° C. for 1 hour (liquid ratio: 50:1) and soaped in the same manner as in Example 1, whereby the fiber was dyed in deep red shade. The fastness of the dyed fiber to sunlight and rubbing was JIS 5th grade, and laundering fastness was JIS 4th grade, while fastness to dry cleaning with perchloroethylene was found to correspond to the JIS 5th grade. Microscopic examination of the cross section of the same fiber revealed no phase separation of the copolymer, the fiber having been uniformly dyed.

Example 6

The same fiber as in Example 5 was dyed in a dyeing bath containing 7% OWF of Sunchromine Black A, 5% OWF of formic acid, and 1% OWF of nonionic surfactant at 100° C. for 90 minutes (liquid ratio: 50:1). The dyed fiber, after washing with water, was subjected to chroming in a bath containing 2% OWF of potassium bichromate and 2% OWF of formic acid for 30 minutes at 100° C. (liquid ratio: 50:1). The fiber was dyed in deep black shade. The fastness of the dyed fiber to sunlight, laundering and rubbing were found to correspond to the JIS 5th grade. Its fastness to dry cleaning with perchloroethylene was also equivalent to the JIS 5th grade. Microscopic examination of the cross section of the same fiber revealed no phase separation of the copolymer, the fiber having been uniformly dyed.

Example 7

Ten percent by weight (based on polypropylene powder) of a copolymer of ethylene-N,N-dimethyl acrylamide-styrene (87.5/8.5/4.0 in mol percent) having a melting point of 102° C. and an intrinsic viscosity of 0.58 dl./g. as measured in tetraline at 135° C. was added to polypropylene powder, and blended. The mixture was shaped into fiber in the same manner as in Example 1. The resulting fiber had a strength of 5.3 g./d. and an elongation of 41%, and no reduction in strength was noted as compared with similar fiber not containing the copolymer. The fiber prepared as described above was dyed with a dyeing bath containing 3% OWF of Forn Orange GFL, 2% OWF of anionic surfactant, and 2% OWF of nonionic surfactant at 100° C. for 60 minutes (liquid ratio: 50:1) and subjected to soaping, whereby the fiber was dyed in very deep orange shade. The fastnesses of the dyed fiber to sunlight, laundering and rubbing were JIS 5th grade and fastness to dry cleaning with perchloroethylene was equivalent to the JIS 3d grade. Microscopic examination of the cross section of the same fiber revealed no phase separation of the copolymer, the fiber having been uniformly dyed.

What we claim is:

1. Mouldable polyolefin composition comprising a polyolefin and a copolymer of (1) ethylene, (2) at least one acrylamide compound and (3) at least one ethylenically unsaturated compound selected from the group consisting of vinyl acetate, methyl acrylate, methyl methacrylate, ethyl acrylate, ethyl methacrylate, N,N-diethyl aminoethyl acrylate, N,N-dimethyl aminoethyl acrylate, N,N-diethyl aminoethyl methacrylate and N,N-dimethyl aminoethyl methacrylate, the amount of each of said acrylamide compound and ethylenically unsaturated compound in the copolymer being 1–50 mole percent based on the ethylene, said copolymer having an intrinsic viscosity of 0.1 to 4.0 dl./g. and being 0.1 to 30 weight percent, based on the weight of the polyolefin.

2. Mouldable polyolefin composition according to claim 1, wherein said acrylamide compound is a member selected from the group consisting of N,N-dimethyl acrylamide and N,N-diethyl acrylamide.

3. Mouldable polyolefin composition according to claim 1, wherein said polyolefin is polypropylene.

4. A shaped article with improved dyeability comprising a composition as claimed in claim 1.

5. A polypropylene fiber with improved dyeability comprising a composition as claimed in claim 1.

References Cited

UNITED STATES PATENTS

| 2,893,970 | 7/1959 | Caldwell et al. | 260—897 |
| 3,115,478 | 12/1963 | Giustiniani et al. | 260—897 |
| 3,156,743 | 11/1964 | Coover et al. | 260—897 |
| 3,226,455 | 12/1965 | Matsubayasi et al. | 260—897 |
| 3,299,185 | 1/1967 | Oda et al. | 260—897 |

FOREIGN PATENTS

| 87,132 | 3/1963 | India. |
| 674,099 | 11/1963 | Canada. |

OTHER REFERENCES

Boening, H. V.: Polyolefins: Structure and Properties, p. 261 (1966) copy in group 142.

MURRAY TILLMAN, Primary Examiner.

C. J. SECCURO, Assistant Examiner.